March 28, 1939. H. P. SMITH 2,152,219
FRUIT DISPLAY STAND
Filed March 28, 1938   2 Sheets-Sheet 1

Howard P. Smith, Inventor
By Charles L. Reynolds, Attorney

March 28, 1939. H. P. SMITH 2,152,219
FRUIT DISPLAY STAND
Filed March 28, 1938  2 Sheets-Sheet 2

Inventor
Howard P. Smith
By Charles L. Reynolds
Attorney

Patented Mar. 28, 1939

2,152,219

UNITED STATES PATENT OFFICE 2,152,219

FRUIT DISPLAY STAND

Howard P. Smith, Olympia, Wash.

Application March 28, 1938, Serial No. 198,464

10 Claims. (Cl. 62—139)

My invention relates to the preservation of fruits and vegetables against deterioration, and the maintenance of their freshness, while on display.

Fruits and vegetables of various and assorted kinds are displayed for sale in piles more or less neatly arranged, wholly open to the air, and in some instances in open air stalls exposed at times to the direct rays of the sun. Various kinds of products may be displayed on adjoining portions of the same stand, for instance citrus fruits, apples, pears, beets, carrots, lettuce, cabbage, cauliflower, and the like. Such assorted products are affected in varying degrees by the conditions to which they are subjected while thus displayed. Pears, for example, are an extremely perishable fruit, and are rapidly affected by subjection to heat, and particularly by subjection to the direct rays of the sun. Carrots tend to dry out and to become flabby. Beets may be less seriously or immediately affected, but their tops become wilted and quickly indicate to a customer a lack of freshness in the beets. Lettuce wilts quickly, and lettuce and cabbage may deteriorate in a short time, either by wilting or by molding, to the point where they are no longer salable. Celery quickly wilts and loses its crispness and thereby a large part of its value unless it is kept continuously cool and damp. The tree fruits, and particularly the citrus fruits, are less seriously affected, but are benefited by being kept cool.

To preserve the fresh appearance and to prevent deterioration of such fruit displays the proprietor may occasionally sprinkle them with water from a sprinkling can, but this is sloppy, can be performed only occasionally, and some such products are wet to too great a degree, and indeed the presence of moisture in constant contact with some such products may in itself cause their deterioration; for instance, cabbage may begin to mold and rot. Pears, when kept moist, rot or deteriorate rapidly. Some fruits cannot be thus moistened, for instance berries and peaches, yet are likely to be moistened in such an indiscriminate wetting down. The procedure described is somewhat improved in more modern display stands by discharging a fine mist of water from nozzles located above the display stand, downwardly and upon the products there displayed, but while this continuous discharge of water droplets is beneficial to some such products, as celery for instance, it still applies too much moisture for other products, as pears, and as pointed out above, moisture should not be applied at all to certain products, as berries. This mist discharge system is therefore not wholly practicable, and is in any event sloppy and wasteful of water, and requires segregation of such products as can not stand the application of water. Moreover there is no practicable way to control the amount of water discharged in accordance with the requirements of different types of products.

It is the principal object of this invention to provide mechanism and a method whereby there may be supplied to fruits and vegetables moisture and cold or cooling air, controlled as to quantity and application, to meet the requirements of the various different products in such manner as to preserve their freshness and appearance, and to preserve them from deterioration over considerable periods of time. Thus, according to this invention, moisture can be supplied with cooling air to such products as require it, the amount of such air or moisture can be controlled, or coolness alone may be supplied to such products as would be harmed by the application of moisture. On the other hand, relatively warm air may be supplied to certain products which are underripe and the ripening of which can be thereby hastened.

It is a further object of the invention to provide a device, such as a display stand, which is suited to the needs of the user or proprietor thereof, in that it is simple and cheap in construction, easy to clean, flexible and adjustable to accommodate varying and perhaps temporary needs, which is cheap to operate, in that it requires but little power and but little expenditure of water, and in that it offers a display stand that can be made in a variety of shapes, if desired, suited to the appropriate and attractive display of the fruits and vegetables.

It is a further object to provide a combined storage and display rack, wherein the fruits and vegetables displayed are properly cooled and kept moist, and also products such as potatoes may likewise be kept cool, when stored in storage bins, by the same agency which maintains the displayed fruits and vegetables cool.

With these and other objects in mind, as will appear hereafter, my invention comprises the novel method, and the novel stand, as shown in the accompanying drawings, as described in this specification, and as will be more particularly defined by the claims which terminate the same.

In the accompanying drawings my invention has been shown embodied in a form which at present is preferred by me, it being understood that the form chosen is illustrative only, and that the principles of my invention as hereinafter defined may be embodied in and worked out by devices varying in form and arrangement from that herein disclosed.

Figure 1:
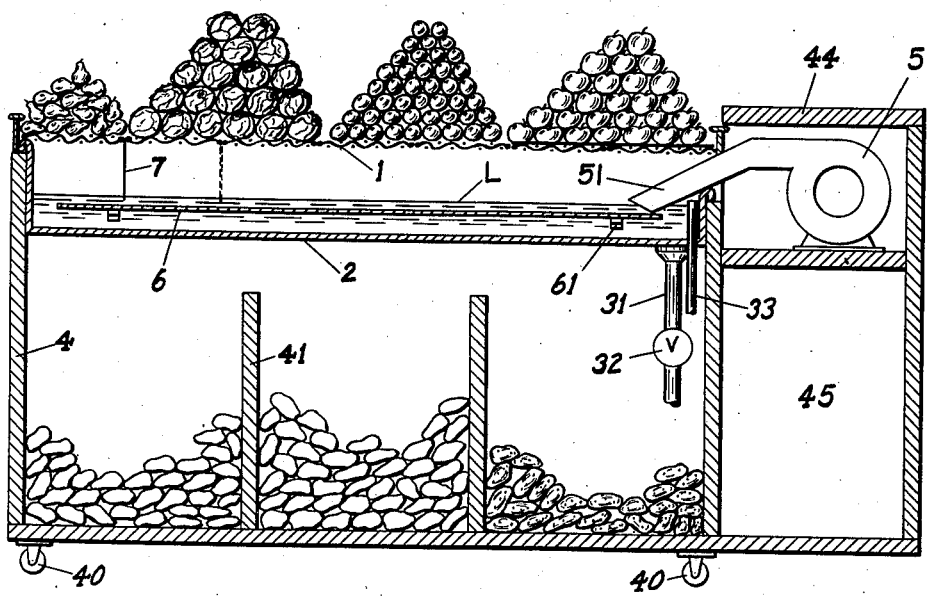
Figure 1 is a longitudinal vertical section through such a display and storage stand.
Figure 2:
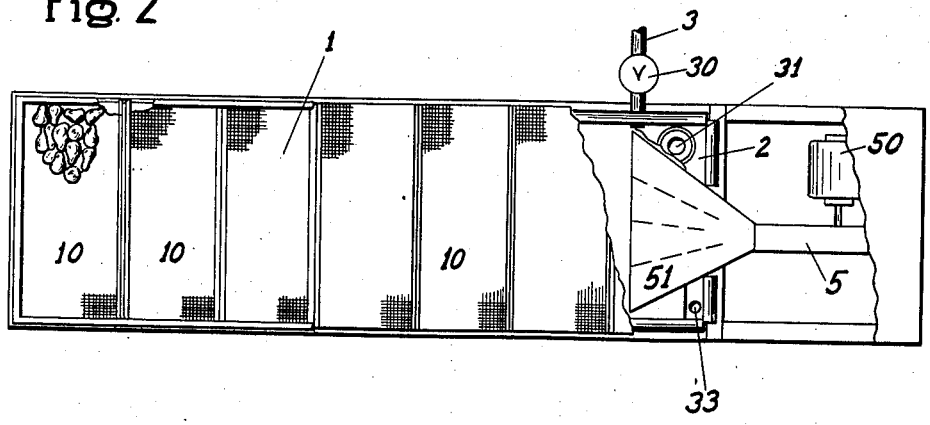
Figure 2 is a plan view of the same, with parts broken away for better illustration.
Figure 3:
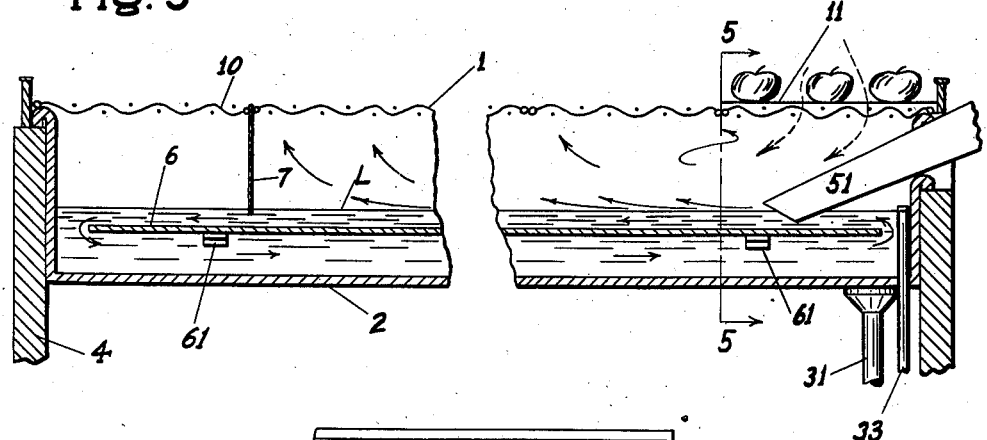
Figure 3 is an enlarged section of the display stand, similar to Figure 1.
Figure 4:
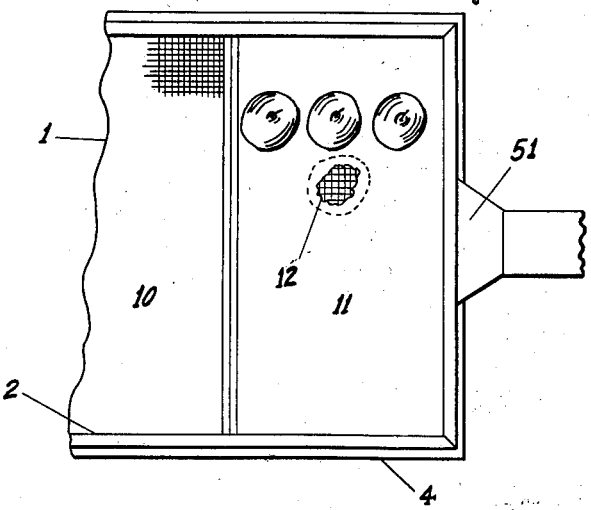
Figure 4 is an enlarged plan view of a portion of the display stand, similar to Figure 2.
Figure 5:
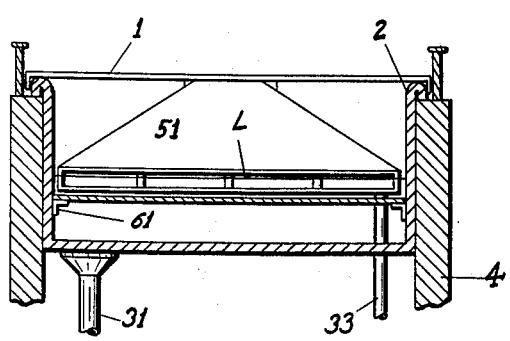
Figure 5 is a transverse section through the display stand, substantially on the line 5—5 of Figure 3.

In the preservation of fruits on display, according to methods heretofore in use, the cooling has been effected by evaporation of moisture deposited upon the surfaces of the fruits and vegetables. The application of moisture has in some instances tended to prevent desiccation and to preserve the crispness and freshness of the product, especially leaf and stalk vegetables. However, the indiscriminate application of water has been harmful to some of the displayed products, but heretofore there has not been found any feasible method or means, so far as I know, to apply the principle of cooling by evaporation without the deposition of water particles indiscriminately and relatively copiously upon all the products displayed. By my method, however, and by the apparatus which will now be described, it is possible to apply moisture-laden air (preferably not particles of moisture) to, over and around such fruits and vegetables as require it, by the deposition of such moisture and its subsequent evaporation by the surrounding warm air to effect cooling of the fruits and vegetables, and by retention of a certain portion of the deposited moisture, in celery and lettuce, for instance, to supply sufficient moisture to preserve the crispness and freshness of the latter. At the same time, and in addition to the evaporation of deposited moisture from the surfaces of the fruits and vegetables, they are further cooled by evaporation of the moisture in the first instance from a body of water placed in close proximity to them as they are displayed, and preferably by evaporation from a vessel or tray of water which is placed immediately beneath them, and over which air is blown or directed close to the surface of the water, to effect evaporation, and hence cooling of the water. The air thus blown over the water acquires a burden of moisture which it deposits upon the fruit as it passes upwardly through, over and around the fruits and vegetables, immediately above. The discharge of air may also be employed to initiate and effect circulation of water in the vessel, and this water, being cooled by the evaporation and being in close proximity to the fruits and vegetables upon the display stand above, cools the latter, and may also serve to cool a storage space immediately beneath, in which storage space may be stored potatoes and like vegetables. By proper control of the discharge of the moisture-laden air, it may be directed upon and over such fruits and vegetables as most greatly require moisture, and diverted from those which do not require it, or which require it in a less degree, and those fruits and vegetables which are contacted by but little or none of the moisture-laden air are nevertheless cooled by the circulating cool water. Further, by control of the points of exit of the moisture-laden air, or the points of entrance of warm exterior air into the space beneath the displayed fruits and vegetables, ripening processes may be hastened or retarded at will, and controllably.

The fruits are displayed upon a screen 1, which is preferably formed of a plurality of separate sections 10, and extends over the top of a metal tray 2, which is filled with water to a level indicated at L. Any suitable means are provided for supplying water and for maintaining the desired level, and also for drainage of the tank. Thus a water supply pipe is shown at 3, controlled by an automatic valve 30, which may be a float valve, to maintain the proper level, and the water may be drained through a drain 31, having a drain valve 32, and in addition, if desired, an overflow pipe 33 may be employed, to insure that the water level will not rise above the intake of this overflow pipe. If the stand is to be portable, connections may be made from the water supply source and to the sewer by means of separable hose connections. It is desirable that such stands be portable so that they may be wheeled out to the front of the store during business hours, and may be wheeled inside for the night, and to this end the cabinet 4, which supports the tray 2 and screen 1, is mounted upon rollers 40. This, however, is a detail which is purely a matter of choice and convenience.

Preferably disposed adjacent one end of the tray 2 is a blower nozzle 51, leading from a blower 5, driven by a motor 50, the nozzle being directed generally along the surface of the water and closely adjacent thereto. Indeed, in order to secure closer association between the air emitted from the nozzle and the water, and in order to initiate movement of the water toward the opposite end of the tank, it is preferred that the end of the nozzle be somewhat inclined, as shown, and that it be disposed, in part at least, beneath the surface L of the water. The nozzle is preferably fan shaped, and extends substantially across the entire width of the tray. The water circulation thus initiated by the discharge of air from the nozzle causes movement of the water toward the opposite end of the tray, as indicated by the arrows.

To complete a closed path, whereby to insure intimate association of all parts of the water with the air, I prefer that there be disposed within the tray a substantially horizontal baffle 6, intermediate the water surface L and the bottom of the tray, and spaced at its ends from the end of the tray. This baffle should extend substantially entirely across the tray, and I prefer that it rest loosely upon brackets 61 secured to the side walls of the tray. In this manner it is not only easily removable for cleaning, but may be shifted longitudinally of the tray to cause one end or the other to approach closer to or to be spaced farther from the adjoining end of the tray, thus to restrict or to increase the space for water circulation and the rapidity thereof. The water circulates over the top of the horizontal baffle 6, and beneath the same and back to the nozzle at the point of initiation. In so doing, and by reason of evaporation of moisture from the surface of the water, the water is cooled, and communicates this lowered temperature to its metal bottom, and thence by air conduction to the space within the cabinet 4, which is preferably a relatively closed space, which may be divided by partitions 41 into spaces for the storage of potatoes, turnips, onions and the like, thus keeping these products, which are stored in bulk, comparatively cool.

The air emitted from the nozzle 51, being directed generally along the surface of the water, picks up moisture by evaporation, and then passes upwardly through the screen 1, and over the fruits and vegetables supported upon the screen. This moisture is in the form of a vapor, not a mist, but to some extent it will be deposited upon the surfaces of the fruits and vegetables over which it passes, and then by further evaporation from such surfaces will cool the fruits and vegetables and maintain them cool. Some of this moisture will collect in the wrinkles and folds of the leaves of leafy vegetables, which are the particular products that require and permit the contact of moisture in the greatest degree with their surfaces. The moisture will not be deposited in appreciable quantities upon the surfaces of such fruits as citrous fruits, apples, pears, peaches, berries and the like, but will be quickly and substantially continuously evaporated from their surfaces by the warmer exterior air, thereby maintaining these fruits and vegetables cool.

If, however, it is desired to prevent access of moisture-laden air to certain products, and to depend instead on the cooling effect of the circulating water, this may be accomplished by the provision of a baffle 7, which extends from the screen 1, inwardly of an end of the tray, down to the water level, and extending usually completely across the tray. Such a vertical baffle 7 may be hung by projecting ends upon the edges of the tray, disposed in the space between two adjoining screen sections 10, and its position lengthwise of the tray may be shifted to cause it to lie between any two adjoining screen sections. Such a baffle operates to prevent access of the moisture-laden air to the space on the side of the baffle which is opposite the nozzle 51. Thus in Figure 1 the pears, which are at the extreme left end of the display stand, are protected by such a baffle 7 from access of the moisture-laden air, but since the lower edge of the baffle 7 does not extend down to the horizontal baffle 6, the water circulation is permitted between the two, and the cool water circulating beneath the pears maintains them relatively cool.

In an analogous way certain products or certain portions of each pile of the products may be protected from access of air or cold from beneath by providing a sheet 11, preferably of the size of a screen section 10, which lies upon the screen section, beneath the fruits or vegetables piled above, to prevent passage of air through the screen and over such fruit. This sheet may be a sheet of paper, so that it is perforable, and if it is desired to subject any particular part of the pile resting upon this sheet to the action of the moisture-laden air tending to rise from beneath it, the paper may be torn out, perforated, or omitted beneath this portion of the pile. On the other hand, if the sheet 11 is placed over a section of the screen which is behind the nozzle 51, an injection effect may be caused, tending to draw downward through the pile, through a hole 12 provided in the sheet, and over and past a particular piece of fruit or a particular section of the pile in registry with the opening 12, the warm exterior air, and this warm air, acting upon the fruit with which it comes in contact, serves to hasten the ripening processes of that particular fruit, yet other fruit in the pile may be protected against this ripening process by the imperforate portions of the sheet 11. The access of warm air beneath the screen is not disadvantageous in small quantities, for the warm air increases the rate of evaporation of the moisture, and thus effects the deposition of greater quantities of moisture-laden air upon the fruit in front of the nozzle 51.

The blower 5 and its motor 50 may be housed in, in the end of the stand. The cover 44, which is placed above them, constitutes a wrapping table, and the space 45 beneath them may serve for the storage of sacks, wrapping paper, and the like, or for the collection of discarded carrot tops, beet tops, and like refuse.

What I claim as my invention is:

1. A display stand for fruits and vegetables, comprising a water-filled tray, a screen supported above the water level therein, and a blower having its nozzle disposed partly above and partly beneath the water level, whereby to effect circulation of the water, and to effect evaporation and delivery of the moisture-laden air upwardly through a part of the screen and over the fruits and vegetables supported thereon, and means to block access of the moisture-laden air to a different part of the screen, whereby the fruits and vegetables on such latter part are cooled by the water circulation thus induced.

2. A display stand for fruits and vegetables, comprising a water-filled tray, a screen supported above the water level therein, means to apply an approximately horizontal force to the water, to advance it towards one end of the tray, and a baffle disposed substantially horizontally between the water level and the tray's bottom, and spaced from its ends, to provide a closed path for circulation of the water thus set in motion.

3. A supply stand for fruits and vegetables, comprising a water-filled tray, a screen supported above the water level therein, means to apply an approximately horizontal force to the water, to advance it towards one end of the tray, a baffle disposed substantially horizontally between the water level and the tray's bottom, and spaced from its ends to provide a closed path for circulation of the water thus initiated, and means supporting the baffle for shifting towards or from an end of the tray, to control circulation through such path.

4. A display stand for fruits and vegetables, comprising a water-filled tray, a screen supported above the water level therein, a blower having its nozzle terminating partly above and partly beneath the water level, and so directed as to initiate movement of the water towards one end of the tray by air emitted from such nozzle, and a baffle disposed substantially horizontally between the tray's bottom and the water level, and spaced from the ends of the tray, to provide a closed path for circulation of the water, the air and its acquired burden of moisture escaping upwardly through the screen and over the fruits and vegetables supported thereon.

5. A display stand for fruits and vegetables, comprising a water-filled tray, a screen supported above the water level therein, a blower having its nozzle positioned to discharge air lengthwise of the tray and closely adjacent the water level, to initiate movement of the water towards one end of the tray, a baffle disposed substantially horizontally between the water level and the tray's bottom, and spaced from its ends to define a closed path for water circulation thus initiated, the air and its acquired burden of moisture escaping upwardly through the screen and over the fruits and vegetables supported thereon, and a second baffle extending between the screen and the water level, intermediate the ends of the tray, to prevent access of the moisture-laden air to the fruits and vegetables beyond such second baffle from the blower nozzle.

6. A display stand for fruits and vegetables, comprising a water-filled tray, a screen composed of a plurality of separate sections each extending transversely of the tray, and all supported above the water level therein, means to deliver air within the tray, along the water's surface, to rise, moisture-laden, through the screen, and a baffle hung by its ends on opposite sides of the tray, between two adjoining screen sections, and extending downwardly from the screen to the water level, to prevent access of air from one side of such baffle to the other side thereof.

7. A combined storage and display stand for fruits and vegetables comprising a storage cabinet open at its top, a metal water-filled tray closing the top of the cabinet, a screen supported above the water level in such tray, means to discharge air lengthwise of the tray and close to the water level, to initiate circulation of the water within the tray, the moisture-laden air rising through the screen and passing over fruits and vegetables supported thereon, and the circulating water, cooled by the evaporation of such moisture, cooling the tray and hence the cabinet therebeneath.

8. A combined storage and display stand for fruits and vegetables comprising a storage cabinet open at its top, a metal water-filled tray closing the top of the cabinet, a screen supported above the water level in such tray, to support the fruits and vegetables, means to evaporate moisture from the water in the tray, and to discharge air thus moisture-laden upwardly through the screen and over the fruits and vegetables supported thereon, and means to circulate the water, cooled by such evaporation, within the tray, thereby to cool the tray and in turn the cabinet therebeneath.

9. A display stand for fruits and vegetables, comprising a water-filled tray, means to maintain a constant water level automatically therein, a screen supported above the water level, and a blower having its nozzle disposed closely adjacent the water level, and directed to discharge air thereover, to acquire a burden of moisture by evaporation from the water, and to pass upwardly through the screen and over the fruits and vegetables supported thereon.

10. A display stand for fruits and vegetables, some of which are benefited by discharge of cool moisture-laden air, and some of which are benefited by cool but relatively dry air, comprising a water-filled tray, a screen supported above but adjacent the water level therein, means to discharge air within the tray, in proximity to the water, to acquire a burden of moisture and to escape through a part of the screen and the fruit or vegetables carried thereby, means to prevent access of such moisture-laden air to another part of the screen, and means to circulate the water within the tray beneath both such parts of the screen, to cool the fruits or vegetables carried by each such part.

HOWARD P. SMITH.